United States Patent [19]
Yokoyama et al.

[11] Patent Number: 5,452,212
[45] Date of Patent: Sep. 19, 1995

[54] NAVIGATION SYSTEM FOR VEHICLE

[75] Inventors: Shoji Yokoyama, Anjo; Kyoumi Morimoto, Nishio; Mitsuhiro Nimura, Okazaki; Akimasa Nanba, Chiryuu; Hiroyoshi Masuda, Nagoya, all of Japan

[73] Assignee: Aisin AW Co., Ltd., Japan

[21] Appl. No.: 106,952

[22] Filed: Aug. 17, 1993

[30] Foreign Application Priority Data

Aug. 19, 1992 [JP] Japan .................. 4-220110
Aug. 19, 1992 [JP] Japan .................. 4-220111

[51] Int. Cl.⁶ .............................................. G06F 17/00
[52] U.S. Cl. .................... 364/449; 364/444; 364/443
[58] Field of Search ................ 364/443, 444, 449, 460

[56] References Cited

U.S. PATENT DOCUMENTS

| | | | |
|---|---|---|---|
| 4,992,947 | 2/1991 | Nimura et al. | 364/444 |
| 5,067,082 | 11/1991 | Nimura et al. | 364/449 |
| 5,121,326 | 6/1992 | Moroto et al. | 364/449 |
| 5,177,685 | 1/1993 | Davis et al. | 364/443 |
| 5,191,532 | 3/1993 | Moroto et al. | 364/449 |
| 5,231,584 | 7/1993 | Nimura et al. | 364/444 |
| 5,293,163 | 3/1994 | Kakihara et al. | 340/995 |

*Primary Examiner*—Kevin J. Teska
*Assistant Examiner*—Susan Wieland
*Attorney, Agent, or Firm*—Lorusso & Loud

[57] ABSTRACT

A navigation system for use in a vehicle including a route-calculating section and a route guide control section. The route-calculating section searches for an optimum route according to conditions set for the search. The guide control section provides displays necessary to guide the driver of the vehicle, and guides the driver by speech. This guide control has a landmark name-setting section which sets the names of landmarks according to information about the landmarks, the information retrieved from a guidance information storage section according to information about the present position from a present position-determining section. A display section displays a whole route map indicating the selected route according to instructions from the route guidance control section. At the same time, the names of the landmarks are presented on the display section. When the navigation system guides the driver to a destination via a tollway such as a toll highway, the name of an entry/exit interchange connecting to the highway is displayed. This permits the driver to take a familiar route up to this interchange.

7 Claims, 8 Drawing Sheets

NAVIGATION SYSTEM FOR VEHICLE

FIELD OF THE INVENTION

The present invention relates to a navigation system which is for use in a vehicle to guide it to a destination through a preselected route and, more particularly, to a vehicular navigation system which searches for an optimum route from a present location to a destination and then displays the route along with landmarks, such as the names of interchanges with ramps connecting to expressways, which are key points along the route, famous buildings, place names, etc.

BACKGROUND OF THE INVENTION

A navigation system for use in a vehicle is equipped with a display device which is used when a route is determined, or the display device is opened automatically or according to driver's request when the vehicle is guided by the navigation system. When a map for determining an optimum route is to be displayed, conditions under which the route is to be set are entered, and searching of the route is started. Then, a detailed map containing the route is displayed. This map is hereinafter referred to as the route search map. When the search is completed, a whole route map, or a wide-area map, is displayed in a form which permits the driver to clearly discern the whole route. The driver can visually and aurally recognize from the whole route map only the route going from the present location to the destination. Subsequently, the driver depresses a guide start button to initiate guidance by means of the navigation system.

As a result of the search, the driver might find that he or she is well acquainted with the displayed route up to an intermediate point. The driver does require guidance along such a familiar route; it suffices to guide the driver only along a further route unknown to him or her. For example, where the route contains a tollway such as an expressway, if the driver is well acquainted with the route up to an interchange with ramps, and if this familiar route is utilized, then the driver is able to drive comfortably. With the conventional navigation system, however, the driver is guided along the whole route even if the driver knows the route up to the utilized interchange. Furthermore, only a whole route map is displayed. Therefore, it is difficult for the driver to understand landmarks along the route to the destination.

SUMMARY OF THE INVENTION

It is an object of the present invention to provide a navigation system which is for use in a vehicle and which guides the driver by displaying the names of landmarks along a searched route when the whole route is being displayed after it has been searched.

The above object is achieved by a navigation system for use in a vehicle, to automatically guide the driver along a preselected route and which comprises a storage means for storing geographical information on the geography of a map and guide information about landmarks on the map, a route-searching means for searching the route according to both said geographical information and conditions under which the route is set, landmark name-setting means for setting landmarks along the searched route, and a display means for displaying a whole route map after the search and the names of the landmarks within the whole route map.

Other objects and features of the invention will appear in the course of the following description thereof.

DETAILED DESCRIPTION OF THE INVENTION

Figure 1:
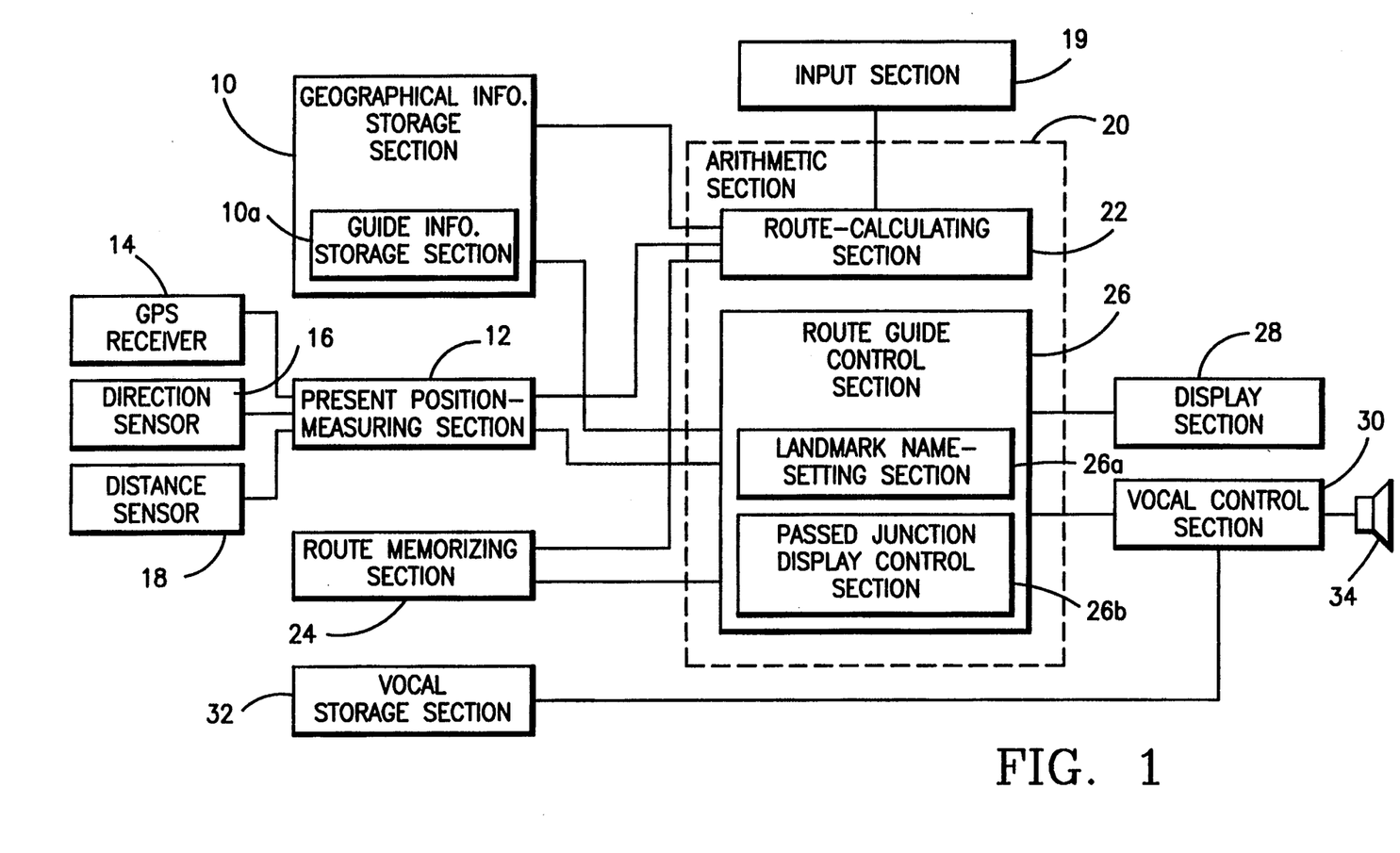
FIG. 1 is a block diagram of a navigation system for use in a vehicle, constructed in accordance with the present invention.

Referring to FIG. 1, there is shown the structure of a navigation system according to the invention and installed in a vehicle. This navigation system comprises a geographical information storage section 10 storing navigation data necessary for calculation of route data needed to guide the driver of the vehicle, and other kinds of data, an arithmetic section 20 for controlling the whole system, a vocal control section 30 which converts speech data into an analog signal according to instructions from the arithmetic section 20 and drives a loudspeaker or loudspeakers 34 to produce a voice for guiding the driver, a display section 28 for displaying a route automatically or in response to a request by the driver to guide the driver, an input section 19 for entering a destination or requesting guidance of a route, a present position-locating section 12 for determining the present location of the vehicle, and a route memorizing section 24 for storing data about the route calculated by the arithmetic section 20 according to the destination.

The geographical information storage section 10 contains a database in which geographical data necessary for guidance along a route, data used to provide displays for guiding the driver, and other data are stored. Of these databases, databases used to guide the driver to a destination and that database used to provide displays for guiding the driver are stored in a guide information storage section 10a.

The present position-locating section 12 determines the present location of the vehicle from information about the location of the vehicle received by a GPS receiver 14 employing GPS (Global Positioning System), azimuth information obtained by a direction sensor 16, distance information obtained by a distance sensor 18, and geographical information read from the geographical information storage section 10, and sends information regarding the present location to the arithmetic section 20. The direction sensor 16 determines the direction in which the vehicle is to travel, from geomagnetism, the azimuth, and the displacement of the relative azimuth of the vehicle. The distance sensor 18 determines the distance traveled by the vehicle from the rotational speed of the wheels.

The input section 19 instructs the arithmetic section 20 to perform processing required for navigation in response to the driver's request. For this purpose, the driver enters a destination and conditions under which a route is to be determined. When the driver wishes, the system offers guidance information by means of speech or visual display.

The arithmetic section 20 comprises a route-calculating section 22 and a route guide control section 26. The route-calculating section 22 calculates a route to the destination according to the geographical information read from the geographical information storage section 10 and according to information about the present location from the present position-locating section 12. The route-calculating section 22 loads data relevant to this route into the route memorizing section 24. The route guide control section 26 produces a vocal, a visual display or both automatically or according to a request signal, depending on the guide information stored in the geographical information storage section 10, the information regarding the present location, and the information relating to the route.

The route guide control section 26 searches for an optimum route by means of the route-calculating section 22 and causes the display section 28 to display the selected route within a whole route map 40 (FIG. 2) showing the point of departure S and the destination D. At the same time, a landmark name-setting section 26a sets the names of landmarks such as interchanges with ramps, tunnels, bridges, and famous buildings according to information about the landmarks read from the guide information storage section 10a. The information about the landmarks is retrieved from the guide information storage section 10a according to information about the present location from the present position-locating section 12. Then, the landmark name-setting section 26a displays the set names of the landmarks within the whole route map on the display section 28. Also, the landmark name-setting section 26a instructs the vocal control section 30 to vocalize the names of the landmarks. At this time, the names of the landmarks may be sent to the vocal control section 30, the address of vocal data may be searched according to name-to-address conversion data loaded in the vocal storage section 32, and vocal data may be read out. Alternatively, the address of the vocal data may be held in the guide information storage section 10a, and the address of requisite vocal data may be sent to the vocal control section 30. The arithmetic section 26 is further equipped with a passed junction display control section 26b which displays the names of junctions which have been passed, traffic signal marks, etc. within a local map on the display section 28 according to passed intersection information read from the guide information storage section 10a. The entire route, from point of departure S to destination D, with landmarks identified by name, may be displayed at the outset of the trip so that the driver may familiarize himself or herself with the determined route prior to departure.

Figure 5:
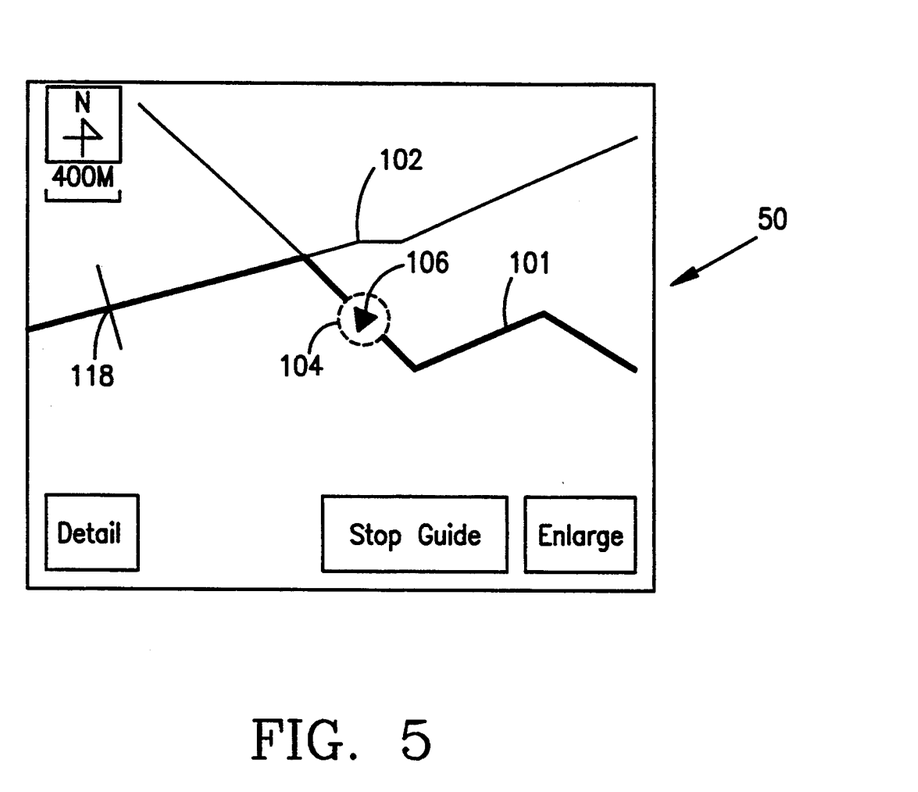
FIG. 5 is a diagram illustrating one example of a wide-area map displayed on the display section of the system shown in FIG. 1.

The display section 28 consists of a color CRT or color liquid-crystal display and is mounted inside the instrument panel near the driver's seat. The driver can confirm the present location of the vehicle by viewing a local map 50 shown in FIG. 5. Also, the driver can obtain information about a forthcoming route. Furthermore, the driver confirms intersections at which the vehicle should turn, as well as the direction of the route, i.e., whether the vehicle should turn to the right or to the left at the intersections. In the illustrated example, the selected route, or a guided route, is indicated by a thick line 101. Other roads are indicated by thin lines 102. The present location of the vehicle is indicated by a circle 104. The direction of travel is indicated by an arrow 106. Roads can be differentiated by the use of a plurality of colors instead of lines of different thicknesses.

All maps necessary for navigation such as a route-setting map based on the geographical data and guidance data processed by the route guide control section 26, a route search map, a whole route map, local maps, and intersection maps are presented in the display section 28 in color.

The display section 28 is equipped with function buttons to allow the navigation system to start guidance along a route and to switch the displayed map to another during guidance. In particular, the display section 28 has a touch screen corresponding to the displayed buttons. The aforementioned operations are carried out according to a signal entered by touching one or more of the buttons. These buttons, the touch screen, and the like together form the input section 19 that produces an input signal. Detailed description of this entry section is omitted because the structure of this entry section is known in the art.

Figure 2:
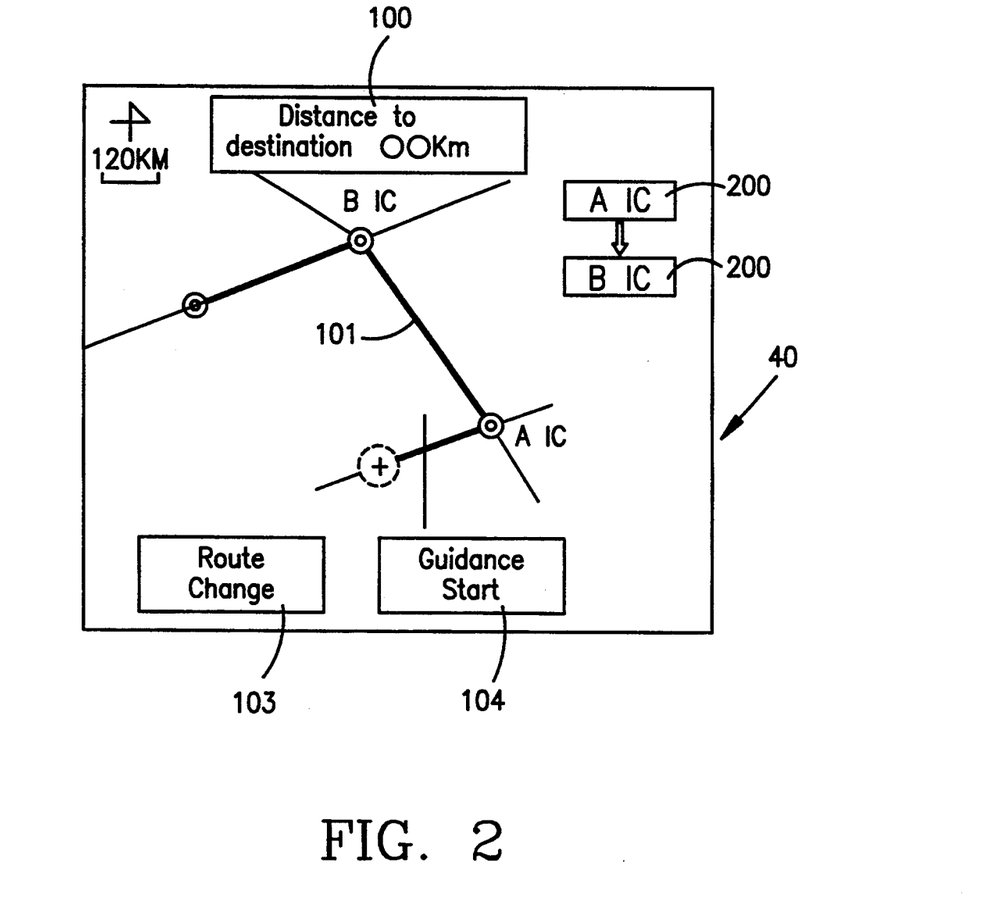
FIG. 2 is a diagram illustrating one example of a whole route map displayed on the display section of the system shown in FIG. 1.

The whole route map 40 shows the whole route after it has been searched. As shown in FIG. 2, this whole route map 40 contains the names of landmarks 200 in addition to the selected route 101 and the distance to destination 100. This whole route map 40 has function buttons to allow the driver access to the navigation system from this map. In the present example, the route is displayed in red. The distance to destination is at upper center. The names of the landmarks are displayed at the right top corner. The function buttons are displayed near the bottom and comprise a route change button 103 that is depressed when the route is to be changed and a guidance start button 104 for initiating guidance.

When the route change button 103 is depressed, a route change-setting map (not shown) is displayed. The driver enters the conditions under which the route is to be modified, i.e. destination, passed points, and whether the vehicle is to travel a highway, and instructs the navigation system to search for the optimum route. As a result, the whole route map shown in FIG. 2 is again displayed. In the illustrated example, the route contains a tollway. The vehicle should enter the tollway at interchange A and leave the tollway at interchange B.

The vocal control section 30 reads information about speech, phrases, one complete sentence, sound, or the like from the vocal storage section 32, Synthesizes such speech or the like according to vocal guide instructions from the route guide control section 26, and produces the speech or the like from the loudspeaker 34. Data for setting a route, data about vocal guidance by the names of landmarks along the route, data necessary for vocal guidance during guidance along the route, and other data for vocal guidance are stored in compressed form in the vocal storage section 32. When the route guide control section 26 orders a display of the whole route, the vocal control section 30 vocalizes the names of the landmarks displayed within the whole route map. In the present example, to guide the driver by vocalizing name of a landmark, the sentence, "This is a route passing through Nagoya Highway Interchange." is vocalized.

Figure 3:
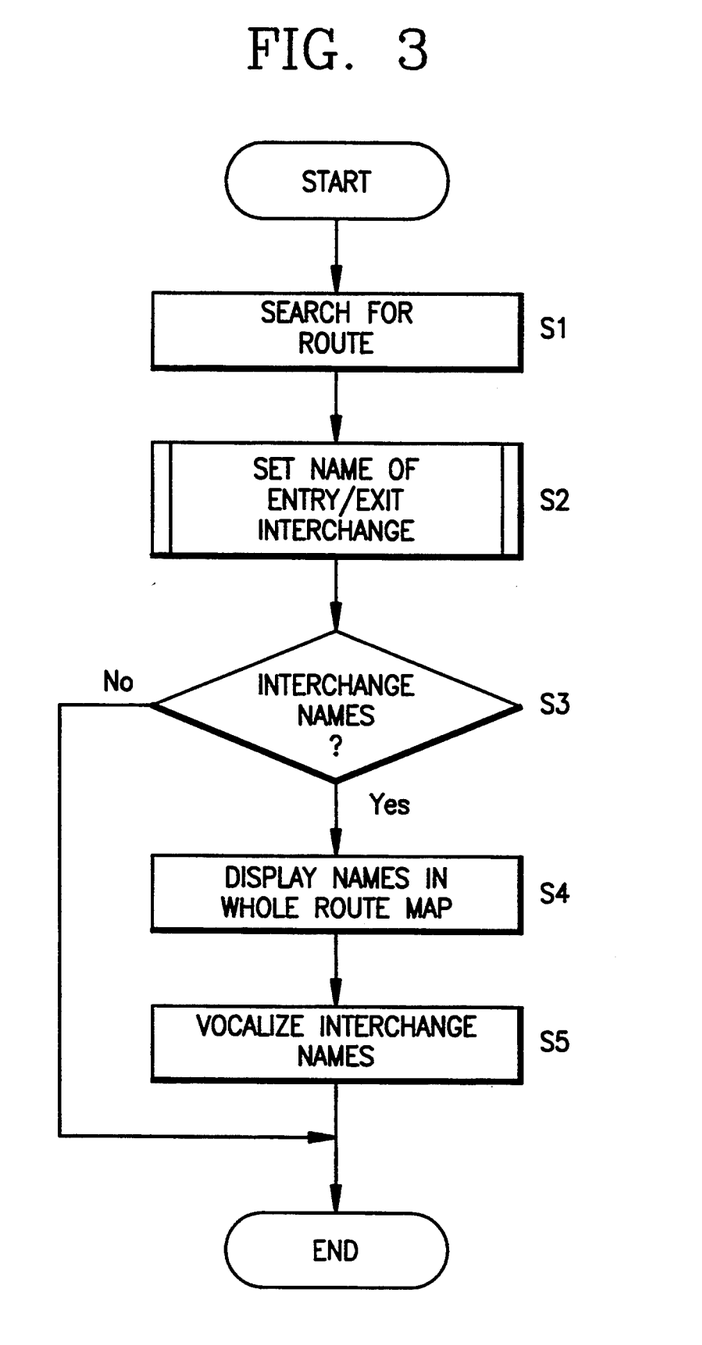
FIG. 3 is a flowchart illustrating a series of operations performed to display the name of an interchange with ramps to be used by the driver.

Processing performed by the arithmetic section to process information about the names of landmarks is described now. FIG. 3 is a flowchart illustrating the process for guiding the driver by the names of entry/exit interchanges as information about the names of landmarks. Each interchange is indicated by the initials IC. First, a route is searched (step 1). The names of entry/exit interchanges are set according to the selected route (step 2). Then, judgment as to whether the interchanges have names is performed (step 3). If there are no names, then the process is ended. If they have names, they are displayed within the whole route map (step 4). Concurrently, vocal information regarding the names of the interchanges is output to guide the driver (step 5). Where it is known that the route contains a highway although no interchange name is set, the name of the highway may be vocalized.

Figure 4:
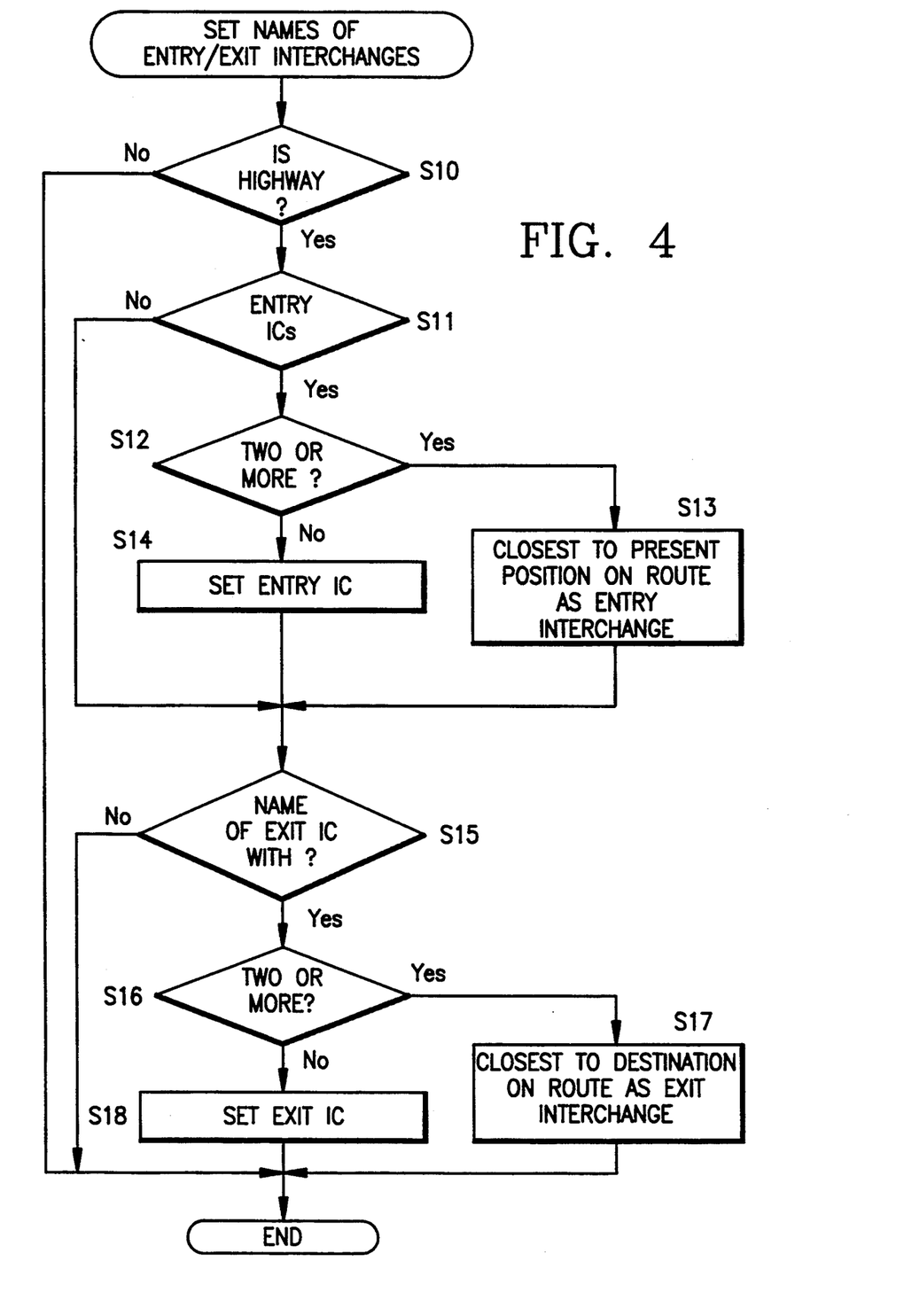
FIG. 4 is a flowchart illustrating a series of operations performed to set the name of an interchange with ramps to be used by the driver.

FIG. 4 is a flowchart illustrating processing for setting the name of entry/exit interchange. A judgment as to whether the route contains an expressway is performed (step 10). If it does contain an expressway, a judgment as to at which entry/exit interchange the vehicle should enter the expressway is performed (step 11). If such an interchange does not exist, e.g. guidance along the route is conducted while the vehicle is traveling on the expressway, then only an interchange permitting the vehicle to exit the highway exists. Then, a process for setting this exit interchange is performed in step 15 and the following steps. If entry interchanges exist, then the number of entry interchanges is counted (step 12). If two or more entry interchanges are present, the interchange closest to the present location along the route is selected as the entry interchange (step 13). If only one entry interchange exists, then this interchange is set as the entry interchange (step 14). Similarly, the name of an exit interchange is set. In particular, a decision is made as to whether there exist exit interchanges (step 15). If such interchanges exist, the number of interchanges is determined (step 16). If two or more exit interchanges exist, the interchange closest to the destination is set as the exit interchange (step 17). If only one interchange exists, then this is set as the exit interchange (step 18).

Figure 6:
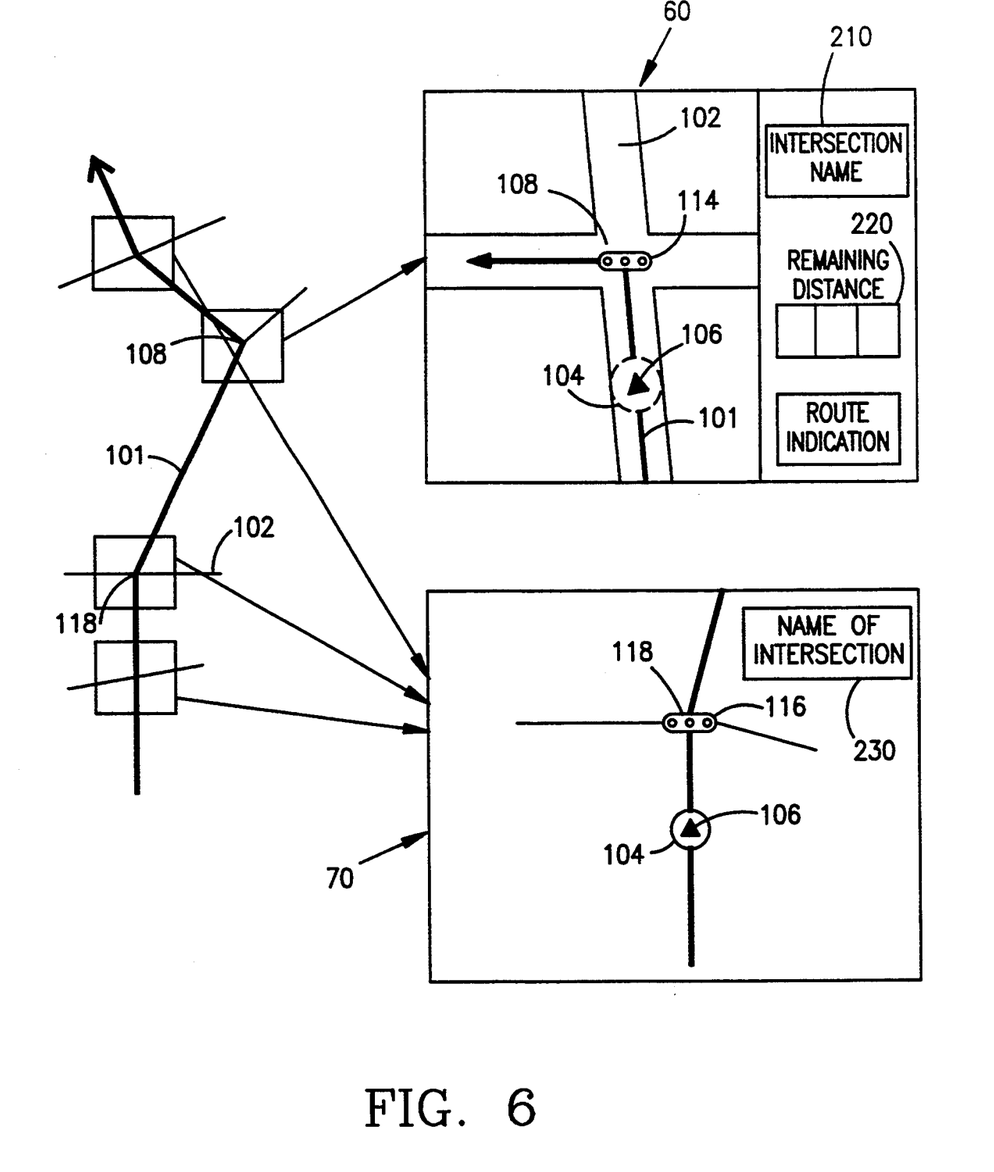
FIG. 6 shows some maps illustrating intersections and their vicinities, (A) illustrating a case in which a vehicle equipped with the system shown in FIG. 1 turns to the right or to the left, (B) illustrating a case in which the vehicle travels straight.

Intersection information is displayed in the manner described below. FIG. 6 shows an example of a display of an intersection at which the direction of the route is changed and an example of a display of an intersection to be passed. When the vehicle approaches an intersection 108 at which the direction of the vehicle should be changed, the displayed map is changed to the local map showing the intersection 60 and its immediate vicinity. If this intersection has a traffic signal, a mark 114 indicative of this and an arrow 106 indicating the direction of travel are displayed at the intersection 108. Also, the name of the intersection 210 and the remaining distance 220 to this intersection are displayed. Simultaneously with this change of the displayed map, speech information about route at this intersection is produced to notify the driver of the change in direction. Where the vehicle travels straight, if it approaches an intersection to be crossed 118, and if this intersection has a traffic signal, then a mark 116 indicating the traffic signal and the name of the intersection 120 are displayed within a local map 70. In the present example, the name of the intersection to be crossed is displayed at the right upper corner as indicated by 230.

Figure 7:
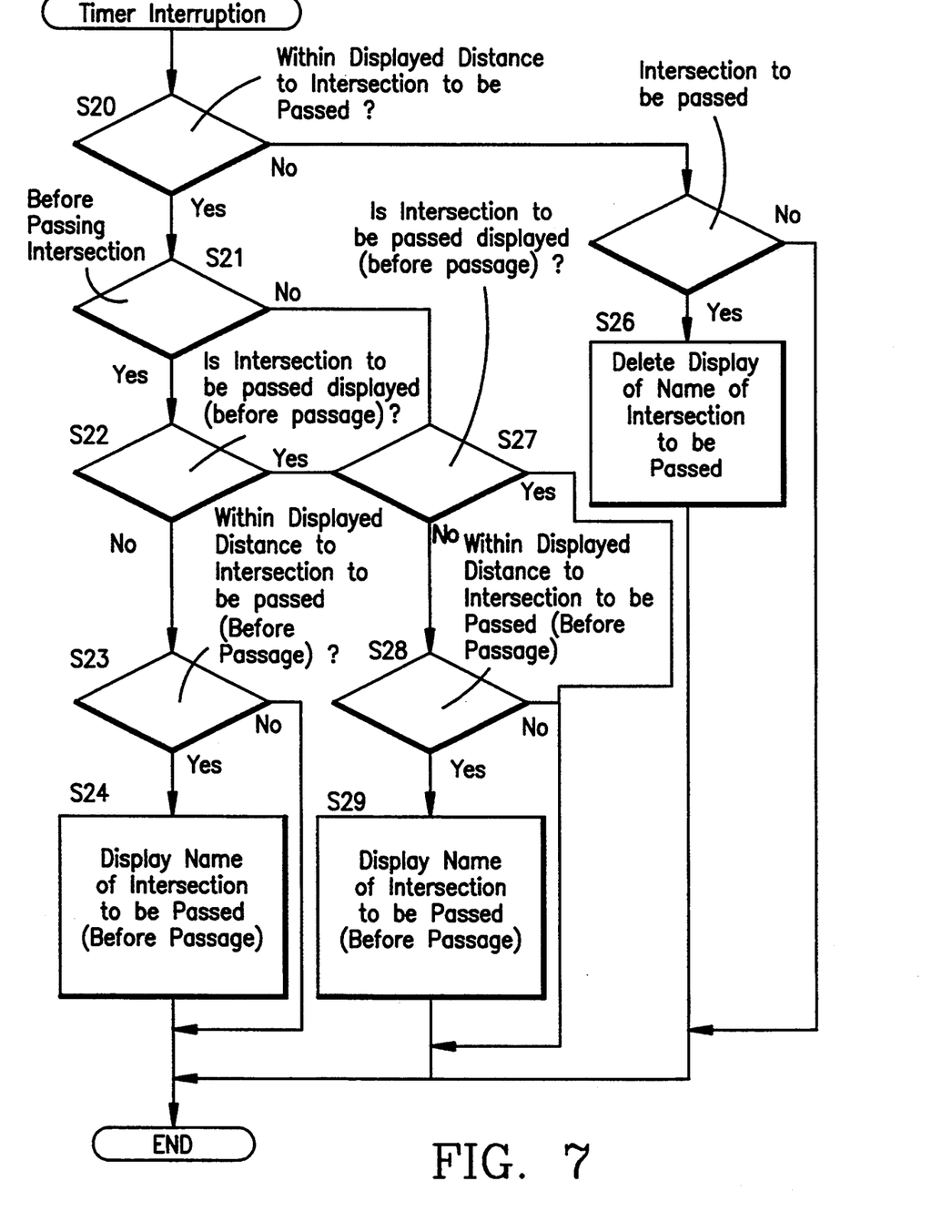
FIG. 7 is a flowchart illustrating a series of operations performed by the navigation system shown in FIG. 1 to display the names of intersections passed.
Figure 8:
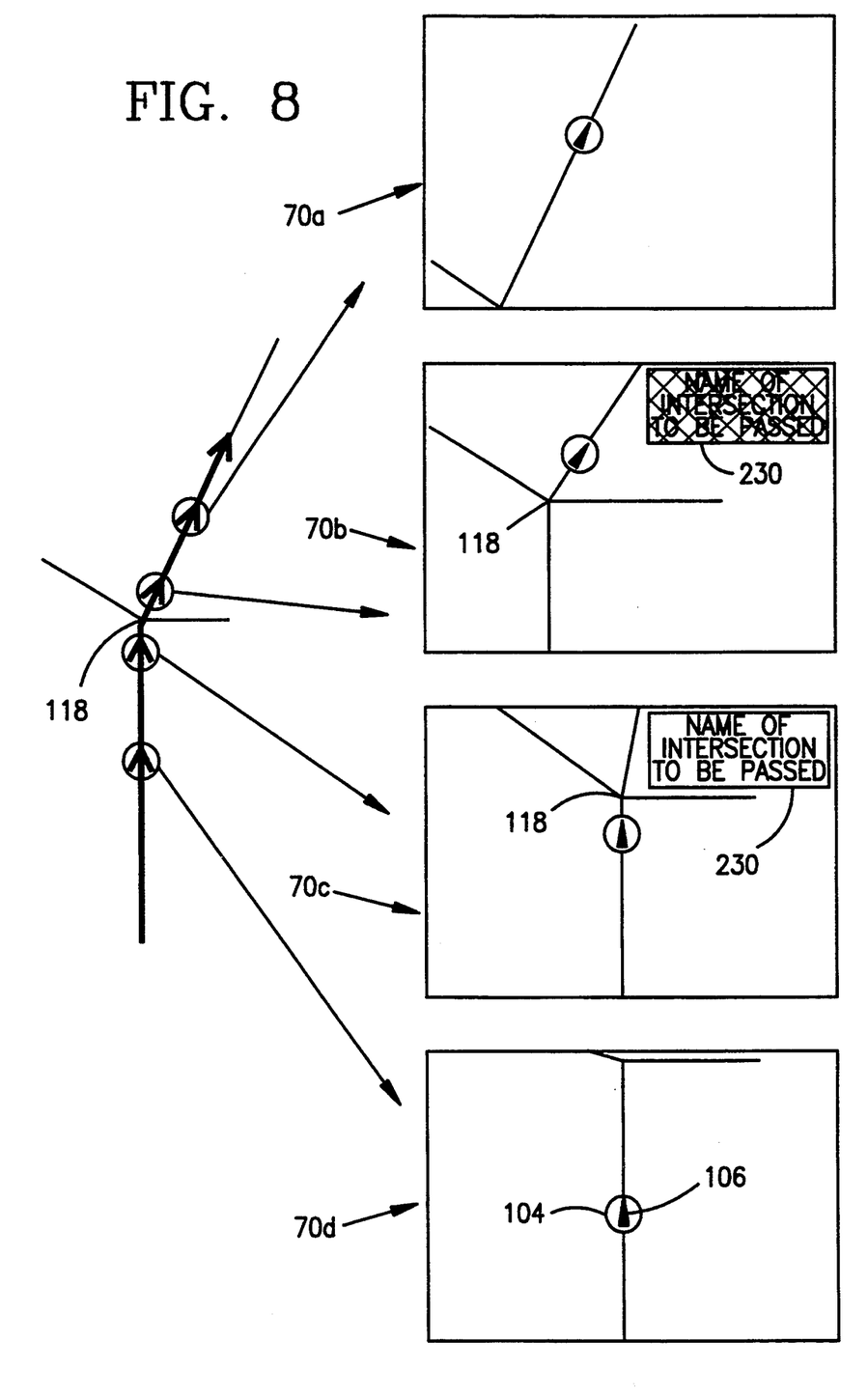
FIG. 8 shows a road map together with some successive local maps which display the names of intersections passed by the vehicle equipped with the navigation system shown in FIG. 1.

Another example of the display of information about an intersection is described below. FIG. 7 illustrates a routine for displaying the name of the intersection to be passed. FIG. 8 contains local maps displaying information about the intersection to be passed. This routine is activated by timer-interrupting a main routine for displaying a guided route within a local map.

When the routine for displaying the name of the intersection to be passed is activated, a judgment as to whether the present location is within a given distance from the intersection to be passed is executed (step 20). If so, a judgment as to whether the vehicle has not yet crossed the intersection is performed (step 22). If the distance to the intersection is not less than the given value, a decision is made as to whether the name of the intersection to be crossed is being displayed (step 25). If the name of the intersection is not displayed, then it follows that the vehicle is traveling at a distance more than the given distance from the crossed intersection. In this case, a detailed local map 70d is shown. If the name of the intersection to be crossed is present, the display is deleted (step 26). In the above-described step 21, if the vehicle has not yet arrived at the intersection, a judgement as to whether the name of the intersection to be crossed is displayed is performed (step 22). If it is not being displayed, a judgment as to whether the distance of the vehicle from the intersection is within the displayed value is performed (step 23). If the distance is within the displayed value, the name of an intersection 210 to be passed appears on the local map (step 24) as shown at 70c. In the aforementioned step 21, if the vehicle has already passed through the intersection, a judgment as to whether the name of the passed intersection is being displayed is executed (step 27). If the name is not being displayed, then a decision is made as to whether the distance of the vehicle from the passed intersection is within the displayed value (step 28). If the distance is within the displayed value, the intersection is again displayed but in a different color after passage thereof (step 29) or shown at 70b. If the distance is greater than the displayed value, the name of the passed intersection is erased by the process of steps 20, 25, and 26 as shown at 70a.

In the present example, the name of the intersection is displayed after passage thereof if the distance is shorter than the displayed value. It is also possible to erase the name immediately after passage. Also, in the present example, the name of the crossed intersection is displayed in a different color, but the name of the intersection may also be displayed without a change of color.

Furthermore, in the present example, the navigation system is designed so that only the names of intersections to be crossed and the presence or absence of traffic signals may be displayed. A structure which vocalizes information about intersections to be crossed in response to the driver's request may be added. If the timing of a display of an intersection to be crossed is judged, stored guide information regarding the intersection to be crossed is read out, and the intersection is drawn on a map which displays route information. Thus, if the vehicle is traveling straight, the names of the intersections to be passed and the presence or absence of a traffic signals are displayed within the map that indicates the route. Therefore, the driver can know which intersection along the route the vehicle should pass or has passed. Consequently, the driver can cope with subsequent information such as a change in the direction of travel (e.g., right or left turn) calmly and precisely. This prevents the vehicle from departing from the route.

As can be understood from the description made thus far, in the present invention, when a search for a route ends, the names of landmarks are set along the selected route. Information about these names for guiding the driver is read out and drawn within a whole route map. Where the vehicle is guided to a destination via a tollway such as an expressway, the name of an entry/exit interchange connected to a highway is displayed as a landmark along the route. If the driver is well acquainted with the route up to this interchange, it is not necessary to guide the driver up to this interchange, since the driver can take a route with which he or she is already familiar.

What is claimed is:

1. A navigation system for a vehicle comprising:
   means for detecting a present position of the vehicle;
   means for inputting a destination;
   search means for selecting a route from the present position to the destination;
   landmark name-setting means for searching for named landmarks along the selected route;
   determining means for determining whether an expressway exists on the selected route;
   interchange identification means for identifying an expressway interchange, along a determined expressway on the selected route, and for setting an interchange identification of the identified interchange as one of said named landmarks;
   a display device;
   first display means for operating the display device to display a whole route map showing the selected route in its entirety, inclusive of the present position, the destination, the determined expressway and the interchange identification; and
   second display means for operating the display device to display a segment of the selected route including an intersection and a name of the intersection.

2. The navigation system of claim 1 wherein said interchange identification means identifies an expressway entrance interchange.

3. The navigation system of claim 1 wherein said interchange identification means identifies an expressway exit interchange.

4. The navigation system of claim 1 wherein said interchange identification means identifies both an expressway entrance interchange and an expressway exit interchange.

5. The navigation system of claim 1 wherein said interchange identification means determines which expressway interchange is closest to the present position and identifies that closest interchange.

6. The navigation system of claim 1 wherein said route search means includes means for identifying a plurality of possible expressway entrance interchanges to an expressway in said route, means for selecting in said route one expressway entrance interchange of said possible expressway entrance interchanges closest to the present position, means for identifying a plurality of possible expressway exit interchanges to the expressway in said route, and means for selecting in said route one expressway exit interchange of said possible expressway exit interchanges closest to the destination.

7. The navigation system of claim 1 further comprising guidance starting means selectable by a vehicle operator for starting a guidance using said second display means.

* * * * *